United States Patent [19]

Junge

[11] Patent Number: 4,487,786

[45] Date of Patent: Dec. 11, 1984

[54] STARCH ENROBING PROCESS FOR COATING FROZEN FOOD

[75] Inventor: Richard C. Junge, Portland, Oreg.

[73] Assignee: Lamb-Weston, Inc., Portland, Oreg.

[21] Appl. No.: 435,914

[22] Filed: Oct. 22, 1982

[51] Int. Cl.³ .................................................. A23L 3/00
[52] U.S. Cl. .................................... 426/302; 426/303; 426/549; 426/661
[58] Field of Search ............... 426/549, 293, 302, 661, 426/611, 303

[56] References Cited

U.S. PATENT DOCUMENTS

| | | | |
|---|---|---|---|
| 3,052,545 | 9/1962 | Ducharme | 426/549 |
| 3,427,951 | 12/1973 | Mitan et al. | 426/549 |
| 3,767,826 | 10/1972 | Fruin | 426/549 |
| 3,956,515 | 5/1976 | Moore | 426/549 |
| 4,293,572 | 10/1981 | Silva et al. | 426/302 |

FOREIGN PATENT DOCUMENTS 5227222 11/1972 Japan ................................ 426/302

*Primary Examiner*—Raymond Jones
*Assistant Examiner*—Elizabeth A. King
*Attorney, Agent, or Firm*—Klarquist, Sparkman, Campbell, Leigh & Whinston

[57] ABSTRACT

A high amylose starch enrobing slurry comprising a starch material of not less than 50 percent by weight of amylose, wheat flour, and edible acid is applied to the outer surface of a frozen food product. After the starch slurry has been applied, the food product is frozen and then coated with a high melting point lipid. The resulting product is then stored at subfreezing temperatures. After the coated food product is deep fried in lipid, the starch enrobing forms a crisp tender crust that is retained for a substantial period of time.

14 Claims, No Drawings

STARCH ENROBING PROCESS FOR COATING FROZEN FOOD

BACKGROUND OF THE INVENTION

This invention relates to a process for making a coating for food products, and in particular, a method of preparing a high amylose starch enrobing slurry for forming a protective film on the outer surface of a frozen food product, and to a food product provided with such film.

There have been known heretofore methods for forming and applying coatings on the outer surfaces of food products comprising an envelope of dough or bread with a moist filling therein to preserve the crispness and uniformity of the outer surfaces thereof. Several general classes of patents disclose processes designed to maintain a desirable texture for food products of this type.

A first class of patents discloses processes for preparing starch-based coatings for frozen food products. U.S. Pat. No. 3,427,951 of Mitan, et al. describes a protective coating that is applied to food products to be subjected to the weightless environment of space. This coating is applied as a continuous envelope on a fragile food product to inhibit shattering thereof and thereby to prevent the production of crumbs. The coating is comprised of a high amylose starch ether formed by reacting a starch material containing over 50 percent amylose with ethylene or propylene oxide. When combined with water, the amylose starch ether forms a liquid film which is applied to a food product.

U.S. Pat. No. 3,767,826 of Fruin describes a process of preparing a batter starch comprising a starch material treated with an oxidizing agent such as calcium hypochlorite for coating frozen food products to cause bread crumbs to adhere to the product.

A second class of patents discloses a number of methods for preparing coatings which do not incorporate the use of starch as a vehicle for protecting the food product. U.S. Pat. No. 4,170,659 of Totino, et at. and U.S. Pat. No. 4,285,979 of Izzi describe processes for preparing a double-layered breadlike frozen food product such as a pizza which has a crisp outer crust that remains undistorted after cooking. To prevent such food products from becoming soggy after thawing, each patent discloses a method based in part upon frying the pizza shell in hot lipid or fat substantially to complete the cooking thereof.

U.S. Pat. No. 4,066,796 of McKee discloses an aqueous dispersion containing water-soluble algin which is applied to the surface of a shaped dough product to retard dehydration of both the crust and food ingredients during storage thereof.

U.S. Pat. No. 4,255,456 of Arendt describes a coating comprised of ground wheat which simulates the taste and appearance of a toasted bun surface when applied to baked, leavened food products. This coating is applied also to retard penetration of moisture, grease, or condiment components into the interior portions of such food products.

U.S. Pat. No. 4,283,424 of Manoski, et al. describes a two-layer covering including an inner layer of cracker crust to absorb excess moisture created during microwave cooking of the food product.

U.S. Pat. No. 4,303,687 of Ratjen describes the process of injecting moisture into the crust of a bakery product to prevent separation of the crust after the bakery product remains frozen for an extended period of time.

A third class of patents discloses methods of applying a coating to individual food pieces to distribute uniformly the coating over the product. U.S. Pat. No. 3,607,313 of Roth describes such a method which is not directed to any particular type of coating product.

A fourth class of patents includes miscellaneous disclosures of various methods of preparing dough covered food products such as pizza products. Included in this class are U.S. Pat. Nos. 3,615,678 and 3,615,679 of Tangel, et al.; U.S. Pat. No. 3,845,219 of Federico; U.S. Pat. No. 4,283,431 of Giordano, et al.; and U.S. Pat. No. 4,303,677 of the De Acetis. None of the patents in this class discusses the use of a starch-based coating or any specific means to prepare or apply a protective coating to the food product described therein.

OBJECTS

A primary object of this invention is to provide a starch coating on dough covered food products which are deep fried in lipid prior to serving and which coating will enhance the commercial shelf life of such products after frying.

More particularly, it is an object of this invention is to provide a starch enrobing slurry comprised of a high amylose starch material and wheat flour that is applied to the outer surface of a dough covered food product to form a film thereon that provides a desirably crisp outer layer on the product after it is deep fried in lipid.

An important object of this invention is to provide such a high amylose starch coating which forms a crust-like surface layer that remains crisp for a substantial period of time.

Another important object of this invention is to provide such a high amylose starch coating with means to retain the moisture content in such coating after it is applied to a food product and while the product is stored in a freezer.

A further important object of this invention is to provide such a high amylose starch coating which remains intact for a substantial period of time after the frozen food product begins to thaw and before it is deep fat fried.

Still another important object of this invention is to provide a frozen food product which is coated with such a high amylose starch enrobing.

SUMMARY OF THE INVENTION

In accordance with the present invention, a high amylose starch material containing not less than approximately 50 percent by weight of amylose is combined with wheat flour and an edible acid to produce an aqueous starch slurry that is applied, as by dipping, to the outer surface of a dough covered frozen food product, such as the pizzas illustrated and discussed in U.S. Pat. Nos. 4,170,659 and 4,285,979, to form a protective film thereon. The food product coated with the starch slurry is then preserved in frozen storage. The high amylose starch functions as a film forming agent that becomes a crust-like enclosure for the dough covered food product when it is deep fried in lipid. The wheat flour and the edible acid, preferably citric acid, cause the starch to adhere to the food product when it is deep fat fried. The edible acid also controls the degree of tenderness of the crust-like enclosure that is formed.

The thickness of the starch coating applied to the food product is controlled by the viscosity of the enrobing slurry to provide a product with a crust-like surface having the proper thickness and texture. It has been determined empirically that an enrobing slurry having a viscosity in Seconds Saybolt Universal units of between 500–2500 SSU produces a coating which will adequately adhere to the frozen food product and produce a texture having the desired characteristics.

The starch slurry is applied to the already frozen food product, whereupon the product is refrozen and preferably coated with a high melting point lipid. The lipid comprises a mixture of acetylated monoglyceride and palm lipid to provide a barrier which prevents the moisture contained in the starch coating from dissipating into the surrounding atmosphere during frozen storage of the food product. This protective barrier also serves to maintain the physical properties of the starch coating so that the film will remain intact for a time after the frozen food product begins to thaw.

The high amylose starch coating described herein is especially advantageous in preserving a crisp outer layer over a previously frozen dough covered food product for a substantial period of time after it has been deep fried in lipid. The coating process described provides a crust-like surface that maintains a desirable texture of up to one hour after deep fat frying, while the internal temperature is maintained above 140° F. This additional shelf life is extremely important in the operation of fast food restaurants.

Additional objects and advantages of the present invention will be apparent from the following detailed description of the process for preparing the high amylose starch enrobing slurry and the exemplary frozen food product which is coated therewith.

DETAILED DESCRIPTION

The starch slurry of the present invention is made up of high amylose corn starch, wheat flour, citric acid, and water. It has been determined empirically that a starch material containing less than approximately 50 percent by weight of amylose produces a mixture that does not produce an adequate film-like coating on the food product when it is deep fat fried. Although the use of corn starch having between 60 and 70 percent amylose is preferred, it is believed that the invention may be practiced with other types of high amylose starch materials. A starch slurry containing between approximately 15 and 45 percent by weight of high amylose starch material is deemed sufficient to practice the invention.

The wheat flour and citric acid components of the starch slurry cause the high amylose starch film-like coating to adhere to the food product after it is deep fat fried. A slurry containing a wheat flour concentration of between 2 and 15 percent by weight is deemed adequate to provide a proper adhesive for the film coating to the food product. Preferably a high protein wheat flour, i.e., a flour containing between 12 and 13 percent by weight of protein, is utilized because it provides a more desirable coating. Lower protein flour may be used, but the coating will be more tender and less durable.

The viscosity of the high amylose starch enrobing slurry is important because it controls the thickness of the crust-like surface formed by the coating which is applied to the food product. The viscosity is affected primarily by the ratio of the combined weight of the mixture of the dry ingredients to the amount of water present and to a lesser extent by the temperature of the enrobing slurry. The temperature is more important in affecting the amount of energy required to freeze the coating once it is applied to the food product. An acceptable range of viscosity for providing the desired thickness of coating on the food product is expressed in Seconds Saybolt Universal units of between 500 and 2500 SSU.

The pH of the starch slurry is controlled by the addition of an edible acid such as, for example, citric acid. The pH of the starch slurry controls the tenderness of the film coating. A neutral starch slurry produces a hard, shell-like coating. A starch slurry with a pH of between 2 and 5.5 is deemed necessary to produce a crust-like enclosure with the desired tenderness. The optimum pH is approximately 3. A sugar such as, for example, dextrose may be added to the slurry to provide a brownish coloring in the fried product. The quantity of sugar is not critical to the operational properties of the resulting starch enrobing.

A high melting point lipid coating preferably is applied to the food product after it is coated with the high amylose starch slurry. The resulting food product is refrozen if necessary. The lipid is preferably a mixture of acetylated monoglyceride and palm lipid. The acetylated monoglyceride is a flexible material and will not crack when frozen. Palm lipid, a less expensive lipid, is used as a diluent of the acetylated monoglyceride to provide a commercially feasible product. Palm lipid is brittle when frozen and thus cannot be used alone as a coating. Preferably, the lipid coating comprises at least 20 percent acetylated monoglyceride lipid and the balance palm lipid. The lipid coating should be of the minimum thickness that provides a complete, uniform coating. In the case of a frozen pizza product, this has been found to be about 7 percent by weight of the pizza product.

The lipid coating is applied to form a moisture barrier so that the moisture contained within the starch coating does not escape into the surrounding atmosphere while the food product is stored in a freezer. In addition, the presence of the lipid coating provides a favorable handling property of the food product while it thaws in preparation for use. When exposed to temperatures above freezing, an unprotected starch coating would melt in a manner similar to ice cream. The presence of the lipid layer retards this process, and the starch coating remains intact for 15 to 20 minutes after the food product is removed from the freezer, thereby facilitating handling in a restaurant.

To prepare the enrobing mixture of the invention, corn starch, wheat flour, citric acid, and dextrose in the desired amounts are dry blended for approximately five minutes. The blended ingredients are slowly added to water. The starch slurry is preferably maintained at a temperature below about 50° F. while the slurry is thoroughly mixed. At 50° F. the viscosity will be between 1000 and 1500 SSU, which is the range desired for application to a food product.

The previously frozen food product is then dipped in the starch slurry and thereafter chilled to 14° F. The food product with the starch coating held at a temperature below freezing is then lipid coated by dipping or spraying with the acetylated monoglyceride-palm lipid solution. The resulting food product is then stored at approximately 0° F. until reheated.

EXAMPLE

The present invention is further illustrated by way of example in the preparation of pizza products resembling a fruit turnover in outer appearance. Such pizza products included envelopes of dough with a moist filling comprising a mixture of cheese, meat, sauce, and other condiments. These had been frozen and held at 0° F.

A slurry for coating the frozen pizza products was prepared in accordance with the proportioning of the ingredients listed in Table I.

TABLE I

| Ingredients | Weight Percent |
| --- | --- |
| Water | 60.61 |
| Corn Starch (65% amylose) | 30.91 |
| Wheat Flour (Collins Best) | 7.75 |
| Citric Acid | .45 |
| Dextrose | .28 |
| TOTALS | 100.00% |

After freezing at 0° F., the frozen pizza envelopes were dipped for 2-3 seconds in the enrobing slurry held at 50° F. and having a viscosity of between 1275 and 1450 SSU. The coated products were removed from the slurry and frozen to 14° F.

The frozen coated pizza product was then sprayed with a lipid solution of 25 percent acetylated monoglyceride and 75 percent palm lipid that formed a lipid coating of approximately 7 percent by weight of the finished pizza product. The resulting product was frozen to 0° F.

The pizza products were prepared for serving by deep frying in hot lipid at 360° F. for 5.5 minutes. During the cooking step, the starch coating became a thin crust-like layer which adhered to the cooked envelope of dough. Upon immediate removal from the cooking lipid, the starch layer was crisp and golden brown.

The pizza products were preserved under infrared heat lamps which maintained the temperature of the products above 140° F. The surfaces of the pizza products remained exceedingly crisp during the first five to ten minutes after they had been removed from the cooking lipid. After 30 minutes under the heat lamps, the starch coatings on the pizza products began to lose some of their crispness. The products retained a commercially acceptable degree of crispness for one hour, and thereafter the quality of crispness declined. As time elapsed, the outer surfaces of the pizza products lost their brightness.

It will be obvious to those having skill in the art that many changes may be made in the above-described details of the preferred process of the present invention. Therefore, the scope of the present invention should be determined only by the following claims.

What is claimed is:

1. A method of preparing a starch enrobing slurry for forming a film-like coating on the outer surface of a frozen food product, which comprises:
   forming an aqueous starch slurry including wheat flour and a high amylose starch material containing not less than 50 percent by weight of amylose,
   the slurry containing between 2 to 15 percent by weight of the wheat flour and between 15 to 45 percent by weight of the starch material and having a viscosity of between 500 and 2500 SSU; and
   adding an edible acid to adjust the pH to between 2 and 5.5.

2. The method of claim 1 wherein the wheat flour is a high protein flour.

3. The method of claim 1 wherein the edible acid is citric acid.

4. The method of claim 1 wherein the starch material is a corn starch containing between 60 and 70 percent by weight of amylose.

5. The method of claim 1 wherein the pH of the starch slurry is about 3.

6. The method of claim 1 wherein the starch slurry has a viscosity of between 1000 and 1500 SSU at a temperature of about 50° F.

7. A method of preparing a frozen food product with a starch enrobing slurry to form a protective film on the outer surface thereof, comprising the steps of:
   forming an aqueous starch slurry including wheat flour and a high amylose starch material containing not less than 50 percent by weight of amylose,
   the slurry containing between 2 to 15 percent by weight of the wheat flour and between 15 to 45 percent by weight of the starch material, having a viscosity of between 500 and 2500 SSU, and having a pH of between 2 and 5.5;
   applying the slurry to the frozen food product in an amount sufficient to form a film-like coating thereon; and
   refreezing the coated food product.

8. The method of claim 7 which includes the additional steps of
   applying to said starch coated product an edible lipid in an amount sufficient to form a continuous protective barrier of said lipid for maintaining the properties imparted by the starch coating; and thereafter
   refreezing the resulting product.

9. The method of claim 8 wherein the lipid is comprised of acetylated monoglyceride and palm lipid.

10. The method of claim 9 wherein the lipid is comprised of at least 20 percent acetylated monoglyceride.

11. The method of claim 7 wherein the aqueous starch slurry when applied to the food product has a viscosity of between 1000 and 1500 SSU at a temperature of about 50° F.

12. The method of preparing a frozen food product which includes the steps of applying to the frozen product an aqueous slurry so as to form a protective coating thereon,
   the slurry comprising between 15 and 45 percent by weight of starch material containing not less than 50 percent by weight of amylose, between 2 and 15 percent by weight of wheat flour, and a pH of between 2 and 5.5; and thereafter
   refreezing the coated food product.

13. The method of claim 12 wherein a coating of lipid is applied to the coated product after refreezing the same.

14. A method of preparing an edible food product, comprising the steps of:
   preparing an envelope of dough having a moist filling therein and freezing the envelope;
   coating the frozen envelope of dough with an aqueous starch slurry in an amount sufficient to form a film-like coating thereon, the slurry comprising between 15 and 45 percent by weight of starch material containing not less than 50 percent by weight of amylose; between 2 and 15 percent by weight of wheat flour; and having a pH of between 2 and 5.5;
   refreezing the envelope coated with the starch slurry;
   applying an edible lipid to the frozen coated envelope; and thereafter
   deep frying in lipid the resulting food product.

* * * * *